Nov. 2, 1948.  H. LAUGHLIN  2,452,772
FILTER
Filed May 28, 1947
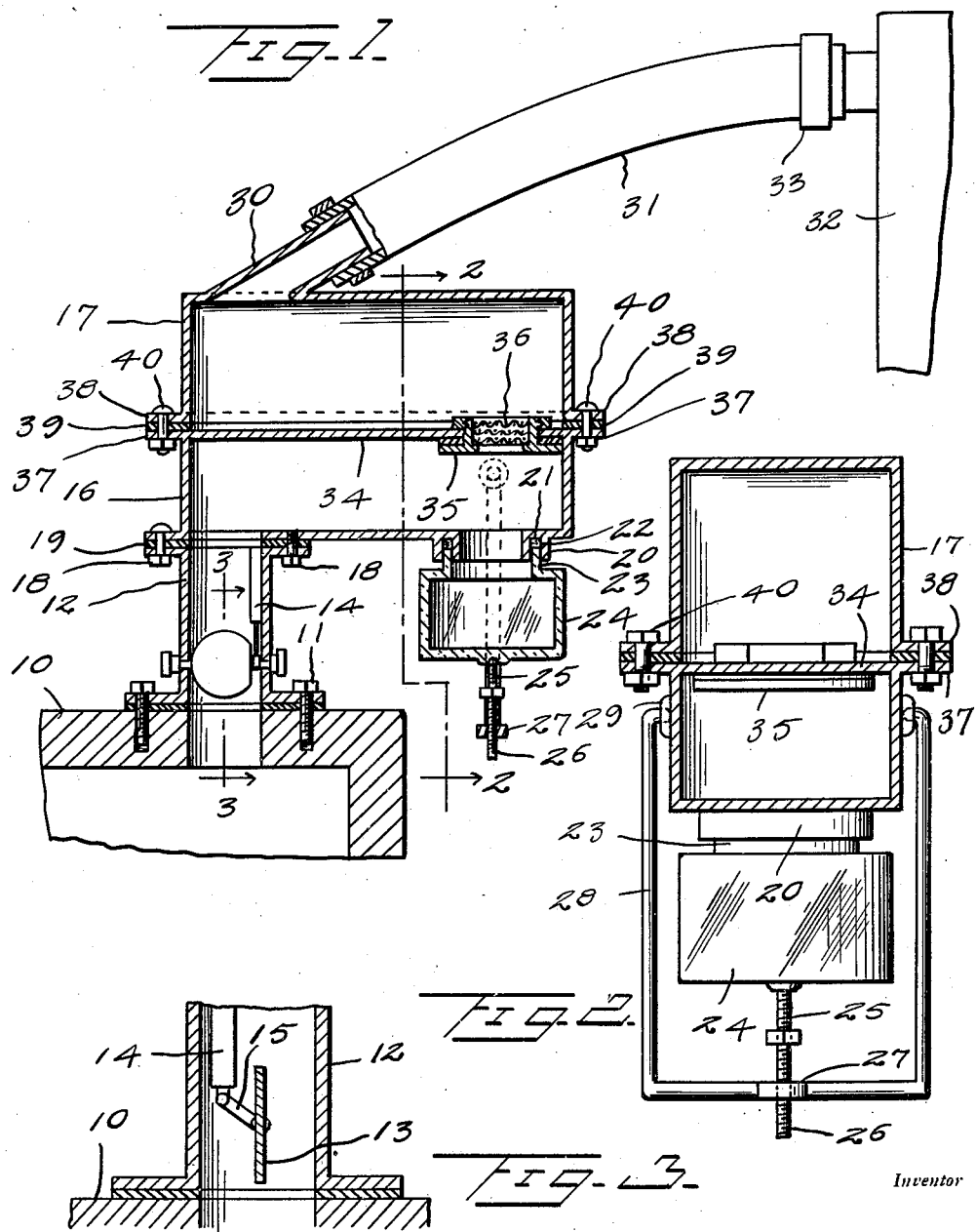
Inventor
Henry Laughlin
By Randolph & Beavers
Attorneys Patented Nov. 2, 1948

2,452,772

UNITED STATES PATENT OFFICE 2,452,772

FILTER

Henry Laughlin, Derry, Pa.

Application May 28, 1947, Serial No. 751,154

1 Claim. (Cl. 210—165)

The present invention relates to radiator filters and it consists in the combinations, constructions and arrangements of parts herein described and claimed.

Generally, the invention comprises a filter particularly useful for the radiators of automobiles and has provision whereby the water passing from an engine block to a radiator may be filtered and any sediment therefrom entrapped in a special casing. It will be seen, however, that the filter may be used with all types of water cooled engines, for hot water heaters and boilers and, in fact, may be placed in the flow line of any apparatus wherein there is a flow of liquid. Provision is also made for the thermostatic control of the flow of water from the engine block.

It is an object of the invention to provide a unitary filter which will be inexpensive to manufacture, simple in construction and efficient in its operation.

A further object of the invention is the provision of simple means for the entrapment of sediment in a device of the character described.

A further object of the invention is the provision of a novel thermostatic control for the flow of water from an engine block to a radiator.

Other and further objects of the invention will become apparent from a reading of the following specification taken in conjunction with the drawing, in which:

Figure 1 is an elevational sectional view of an embodiment of the invention,

Figure 2 is an enlarged sectional view taken along line 2—2 of Figure 1, and

Figure 3 is an enlarged sectional view taken along line 3—3 of Figure 1.

Referring more particularly to the drawings, there is shown therein an engine block 10 to which is affixed by means of bolts 11 a standpipe 12 having a pivotally mounted valve 13 therein which valve is adapted to be controlled by means of a thermostat 14 which is connected to the valve 13 by means of a link 15.

The standpipe 12 is connected to a lower section 16 of a casing which is also provided with an upper section 17 by means of bolts 18. A gasket 19 is interposed between the lower section 16 and the standpipe 12.

Dependent from the lower section 16 is a port 20 having an annular recess 21 formed therein and having a gasket 22 mounted in said recess. The recess 21 is adapted to receive the annular lip 23 of a sediment trap 24. To the underside of the trap 24 is affixed a pin 25 having a threaded lower end 26 adapted to engage within an interiorly threaded collar 27 formed in a U-shaped bracket 28 pivotally mounted in a pair of ears 29 formed on the outer side of the section 16.

The upper casing is provided with an outlet pipe 30 to which is adapted to be connected a flexible hose 31 which, in turn, connects with a radiator 32 as indicated at 33. The upper end of the lower section 16 is provided with a cover 34 in which is mounted a filter 35 having a plurality of screens 36.

A flange 37 is formed in the lower section 16 and a flange 38 is formed in the upper section 17 and a gasket 39 is held between said flanges by means of bolts 40.

In operation, it will be apparent that when the motor is running water will be heated within the engine block 10 and that eventually the thermostat 14 will cause the valve 13 to open and allow a circulation of water upwardly through the pipe 12 thence into the section 16, thence through the screens 36 where any sediment screened thereby will be eventually collected in the trap 24. The clear water will now pass into the section 17 and thence through the pipe 30, connection 31 and into the radiator 32 where it will eventually recirculate to the engine block.

It will be apparent that the sediment trap 24 may be removed by rotating the trap 24 and its attendant pin 25 which will screw downwardly into the collar 27 thus releasing the lip 23 from the recess 21 whereupon the bracket 29 may be rotated and the contents of the thus exposed trap 24 removed.

While but one form of the invention has been shown and described herein, it will be readily apparent to those skilled in the art that many minor modifications may be made without departing from the spirit of the invention or the scope of the appended claim.

What is claimed is:

A filter for a flow line comprising a casing having upper and lower sections and a partition plate mounted horizontally between the said sections and providing upper and lower chambers in the casing, the upper section having an outlet at its top and the lower section having an inlet at its bottom adjacent one end thereof, said partition having an opening formed therein, a sleeve mounted through the opening of the partition and carrying filtering material for removing foreign matter from liquid passing through the sleeve from the lower chamber into the upper chamber, a neck extending downwardly from the bottom of the lower chamber about an opening formed therein near the opposite end of the lower chamber from its inlet, said neck being formed at its lower end with an annular recess, a gasket in said recess, a cup under the casing having an upwardly projecting neck fitting snugly into the recess and against the gasket, a U-shaped bracket having a bridge spaced downwardly from the cup and arms extending upwardly from ends of the bridge in spaced relation to opposite sides of the cup and the lower section of the casing and provided at their upper ends with pintles engaged in sockets at opposite sides of the said lower section and mounting the bracket for swinging movement longitudinally of the casing from a raised position to a depending position disposing the bridge under the cup diametrically thereof, said bridge having an enlargement midway its length formed with a threaded opening, and a threaded stem engaged through the threaded opening and disposed vertically under the cup with its upper end in pressing engagement with the bottom of the cup to hold the neck of the cup in compressing engagement with the gasket and form a tight joint when the bracket is in its lowered position.

HENRY LAUGHLIN.

REFERENCES CITED

The following references are of record in the file of this patent:

UNITED STATES PATENTS

| Number | Name | Date |
| --- | --- | --- |
| 1,628,955 | De Pries | May 17, 1927 |
| 1,715,492 | Bassion | June 4, 1929 |
| 1,857,606 | Rendelman | May 10, 1932 |
| 2,118,510 | Hromadka | May 24, 1938 |
| 2,174,769 | White | Oct. 3, 1939 |
| 2,230,408 | Lackey | Feb. 4, 1941 |